July 28, 1953 L. D. HOOD 2,647,160
INSULATING SHEATH WITH EMBEDDED ELECTRICAL CONDUCTOR
Filed Nov. 26, 1951
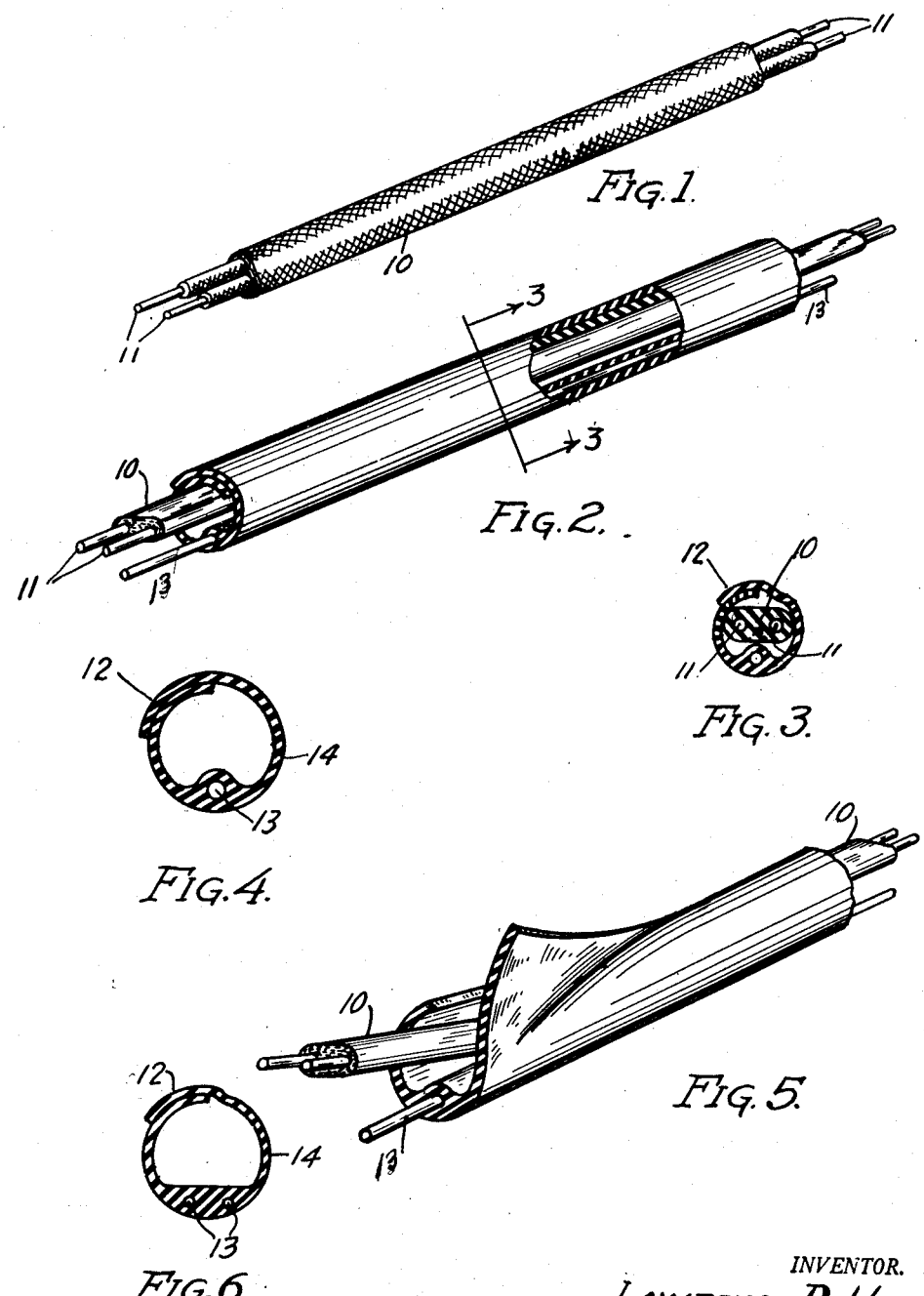
INVENTOR.
LAWRENCE D. Hood
BY
Martin E. Anderson
ATTORNEYS Patented July 28, 1953

2,647,160

UNITED STATES PATENT OFFICE 2,647,160

INSULATING SHEATH WITH EMBEDDED ELECTRICAL CONDUCTOR

Lawrence D. Hood, Jefferson County, Colo.

Application November 26, 1951, Serial No. 258,235

2 Claims. (Cl. 174—98)

This invention relates to improvements in electrical conductors and has reference more particularly to a conductor in the form of a longitudinally split tubular sheath of insulating material having one or more longitudinally extending metallic conductors embedded therein.

In the wiring of residences and other buildings for light, power and for signals, non-metallic duplex cables are frequently employed. In some instances, it is necessary to employ triplex cables for short runs. Where these wires are necessary, triplex cables must be substituted for the duplex and this necessitates the carrying both kinds in stock. There are also cases where the duplex cables are already in place and where it is desirable to add a third parallel conductor. If a single conductor is added it has to be separately supported and forms a circuit that has several objectionable features.

It is the object of this invention to produce a conductor in the form of a tube of insulting material that has one or more conductors embedded in its wall. The tube is split lengthwise so that it may be readily opened to permit a non-metallic duplex cable to be positioned therein. The material is electrically insulated and has an inwardly coiling or rolling action so that it will automatically close after the edges have been separated and to some extent, bind the duplex cable that has been inserted. The assembly of the duplex cable and the tubular conductor forms a triplex conductor.

The invention can be most clearly explained and most readily understood when reference is had to the accompanying drawing where the invention has been illustrated and in which Figure 1 is a perspective view showing an ordinary non-metallic duplex cable;

Figure 2 is a view similar to Figure 1 and shows a duplex cable positioned in the tubular sheath, the two forming a triplex cable;

Figure 3 is a section to a somewhat enlarged scale, taken on line 3—3, Figure 1;

Figure 4 is a section similar to Figure 3 but which does not contain the duplex cable;

Figure 5 is a view illustrating the manner in which the duplex cable is put into place; and Figure 6 is a section similar to that shown in Figure 3, and shows how two conductors may be embedded in the wall of the tubular sheath.

Referring now to the drawing, reference numeral 10 designates a section of non-metallic sheathed cable of the kind that is now quite extensively employed without conduits. It is not the intention to describe the insulation of the cable except to say that it is usually covered with a fabric braid. The two metallic conductors have been designated by numeral 11.

The conductor that forms the subject of this invention is preferably constructed of rubber, rubber impregnated fabric, plastic or any other suitable material and is preferably so formed that the edges overlap as indicated at 12. The material must have sufficient rigidity and set to be inherently coiling so that when it is not constrained by some external force it will automatically assume the shape shown in Figures 3, 4 and 6.

An electrical conductor such as a copper wire 13 is embedded in the wall 14, so as to be entirely covered by insulating material. In some cases two conductors may be embedded in the wall as shown in Figure 6. Any other number of conductors may be embedded in the wall, however, there must be at least one.

Whenever it becomes necessary to run three wires instead of two, a tubular conductor like the one that forms the subject of this invention, is put into position on the duplex cable with the result that there are then available three wires.

Although the tubular sheath in most cases has a single metallic conductor embedded in its wall any greater number may be used.

What is claimed as new is:

1. An electrical conductor for the purpose specified comprising a flexible non-metallic tube of electrically insulating material, split lengthwise and provided with normally overlapping edges, at least one metallic electrical cable embedded in the wall of the tube, the material having an inherent inwardly coiling action which serves to hold the edges of the tubular member in lapped position, the material having sufficient flexibility to allow the edges to be separated sufficiently to permit a duplex non-metallic cable to be inserted and sufficient resiliency to return the edges to closed position.

2. A multiple line electrical conductor of the class described, comprising a substantially cylindrical tube of elastic material having a wall partially coiled upon itself circumferentially, a portion of said wall being thickened and having at least one conducting wire embedded therein longitudinally thereof, said tube being of sufficient internal size to carry a cable of conducting wires.

LAWRENCE D. HOOD.

References Cited in the file of this patent

UNITED STATES PATENTS

| Number | Name | Date |
| --- | --- | --- |
| 1,841,257 | Schemmel | Jan. 12, 1932 |
| 1,965,953 | Curtis | July 10, 1934 |
| 2,066,242 | Abbott | Dec. 29, 1936 |